US012803447B2

(12) United States Patent
Guo et al.

(10) Patent No.: US 12,803,447 B2
(45) Date of Patent: Nov. 17, 2026

(54) ISOLATED POWER CONVERTER AND CONTROL CIRCUIT THEREOF

(71) Applicant: SHANGHAI BRIGHT POWER SEMICONDUCTOR CO., LTD., Shanghai (CN)

(72) Inventors: Yanmei Guo, Shanghai (CN); Zhen Zhu, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 151 days.

(21) Appl. No.: 18/828,264

(22) Filed: Sep. 9, 2024

(65) Prior Publication Data

US 2025/0105747 A1 Mar. 27, 2025

(30) Foreign Application Priority Data

Sep. 21, 2023 (CN) ......................... 202311226774.1

(51) Int. Cl.

*H02M 3/335* (2006.01)
*H02M 1/00* (2006.01)
*H02M 1/36* (2007.01)

(52) U.S. Cl.

CPC ..... *H02M 3/33507* (2013.01); *H02M 1/0016* (2021.05); *H02M 1/36* (2013.01)

(58) Field of Classification Search

CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

See application file for complete search history.

(56) References Cited

U.S. PATENT DOCUMENTS

2024/0113632 A1* 4/2024 Li ........................... H02M 1/36

* cited by examiner

*Primary Examiner* — Bryan R Perez

(74) *Attorney, Agent, or Firm* — MUNCY, GEISSLER, OLDS & LOWE, P.C.

(57) ABSTRACT

An isolated power converter and a control circuit thereof are disclosed. The control circuit includes a secondary side controller which receives a first sample signal characterizing an output voltage of the isolated power converter and generates a first control signal. A primary side control module receives a second sample signal characterizing primary side current and generates a second control signal which controls state of a primary side power transistor, providing PSR. A secondary side follow-up control module receives the first control signal and generates a third control signal which controls states of primary side power transistor, thus providing SSR. A control switching module receives a third sample signal characterizing output voltage and causes switching from PSR to SSR when the third sample signal satisfies a predefined condition. During startup of isolated power converter, PSR is provided first, and switching is then caused to SSR when the predefined condition is satisfied.

15 Claims, 12 Drawing Sheets

ISOLATED POWER CONVERTER AND CONTROL CIRCUIT THEREOF

CROSS-REFERENCE TO RELATED APPLICATION

This application claims the priority of Chinese patent application number 202311226774.1, filed on Sep. 21, 2023 and entitled "ISOLATED POWER CONVERTER AND CONTROL CIRCUIT THEREOF", the entire contents of which are incorporated herein by reference.

TECHNICAL FIELD

The present disclosure relates to the field of electronic circuits and, in particular, to an isolated power converter and a control circuit thereof.

BACKGROUND

Most existing isolated power converters include multiple controllers. Such a power converter includes at least a primary side controller and a primary side power transistor, both on the primary side, a secondary side controller on the secondary side, and a transformer coupled between the primary side controller and secondary side controller to provide electrical isolation. The primary side controller and secondary side controller are isolated by and communicate through a coupler.

Startup of such an isolated power converter involves turning on a power source, causing a power supply voltage for the primary side controller to rise. The primary side controller then starts operating to control a state of the primary side power transistor, providing primary side regulation (PSR). A voltage is subsequently produced across a winding in the transformer to supply power to the secondary side controller. As the power supply voltage for the secondary side controller rises, the secondary side controller starts operating to control a state of the primary side power transistor, providing secondary side regulation (SSR).

In this startup approach, as there is no power available for the secondary side controller at the beginning of the startup process, the primary side controller must start operation first so that power necessary for the secondary side controller to get control of the primary side power transistor is produced and supplied to the secondary side controller. This may lead to output voltage overshoot during startup.

SUMMARY

It is an objective of the present disclosure to overcome the problem of possible output voltage overshoot during startup associated with the existing isolated power converters by presenting an isolated power converter and a control circuit thereof.

The above objective is attained by a control circuit of an isolated power converter according to the present disclosure. The isolated power converter includes a primary side power transistor. The control circuit includes a secondary side controller and a primary side controller.

The secondary side controller is configured to receive a first sample signal characterizing an output voltage of the isolated power converter and thereby generate a first control signal.

The primary side controller includes:

- a primary side control module configured to receive a second sample signal characterizing a primary side current and thereby generate a second control signal which controls a state of the primary side power transistor, thereby executing primary side regulation (PSR) mode;
- a secondary side follow-up control module configured to receive the first control signal and thereby generate a third control signal which controls a state of the primary side power transistor, thereby executing secondary side regulation (SSR) mode; and
- a control switching module configured to receive a third sample signal characterizing the output voltage and, when the third sample signal satisfies a predefined condition, switch the primary side control module from PSR to SSR, wherein the predefined condition is modifiable.

Optionally, the third sample signal may satisfy the predefined condition when a value of the third sample signal is greater than a switching threshold.

Optionally, the primary side controller may further include:

- a resistive voltage divider module configured to sample the output voltage and thereby generate the third sample signal; and
- a threshold setting module configured to receive a first reference voltage signal and thereby generate the switching threshold.

Optionally, the predefined condition may be modifiable by adjusting a resistance of a voltage divider resistor in the resistive voltage divider module and hence a sampling ratio of the resistive voltage divider module.

Optionally, the predefined condition may be modifiable by adjusting a value of the first reference voltage signal.

Optionally, the primary side controller may further include:

- a current source; and
- a tuning resistor, the tuning resistor including a first end connected to the current source and the threshold setting module and providing the first reference voltage signal, the tuning resistor including a second end connected to a primary side ground, wherein the predefined condition is modifiable by adjusting the value of the first reference voltage signal using the current source, and/or by adjusting the value of the first reference voltage signal through changing a resistance of the tuning resistor.

Optionally, the primary side control module may include a first drive generator module including:

- a first comparator configured to receive and compare the second sample signal and a primary side on-time control signal and thereby generate a first comparison signal, the primary side on-time control signal configured to control an on-time of the primary side power transistor; and
- a first logic circuit configured to receive the first comparison signal and a primary side frequency control signal and thereby generate the second control signal, the primary side frequency control signal configured to control a turn-on time of the primary side power transistor.

Optionally, the primary side frequency control signal and the primary side on-time control signal may be both predefined fixed signals.

Optionally, the primary side control module may further include:

- an operational amplifier configured to receive the third sample signal and a second reference voltage signal, amplify an error therebetween and thereby generate a primary side amplified error signal;

a frequency control module configured to receive the primary side amplified error signal and thereby generate the primary side frequency control signal; and a turn-off control module configured to receive the primary side amplified error signal and thereby generate the primary side on-time control signal.

Optionally, the switching threshold may be smaller than a value of the second reference voltage signal.

Optionally, the secondary side controller may include a secondary side control signal generator module including:

a second comparator configured to receive and compare the first sample signal and a third reference voltage signal and thereby generate a second comparison signal serving as the first control signal, wherein the first control signal carries information about a turn-on time of the primary side power transistor.

Additionally, the secondary side follow-up control module may include:

a frequency and on-time control module configured to receive the first control signal and thereby generate a secondary side on-time control signal; and a second drive generator module configured to receive the first control signal, the secondary side on-time control signal and the second sample signal and thereby generate the third control signal.

Optionally, the secondary side controller may include a secondary side control signal generator module including:

a second comparator configured to receive and compare the first sample signal and a third reference voltage signal and thereby generate a second comparison signal;

a timer configured to be started at a turn-on time of the primary side power transistor and generate a secondary side on-time control signal after the elapse of a predetermined length of time; and a second logic circuit configured to receive the second comparison signal and the secondary side on-time control signal and thereby generate the first control signal, wherein the first control signal carries information about both the turn-on time and a turn-off time of the primary side power transistor.

Additionally, the secondary side follow-up control module may include:

a second drive generator module configured to receive the first control signal and thereby generate the third control signal.

Optionally, the switching threshold may be smaller than a value of the third reference voltage signal.

Optionally, in the event of startup failure of the isolated power converter, or of a drop of the output voltage despite successful startup of the isolated power converter, the switching threshold may be increased, or the third sample signal may be reduced. Additionally, in the event of unsmooth rising of the output voltage despite successful startup of the isolated power converter, the switching threshold may be decreased, or the third sample signal may be increased.

The present disclosure also provides an isolated power converter including the control circuit as defined above, wherein the control circuit is used to control a state of a primary side power transistor.

In the isolated power converter and control circuit thereof, of the present disclosure, the secondary side controller receives the first sample signal that characterizes the output voltage of the isolated power converter and thereby generates the first control signal. The primary side control module receives the second sample signal that characterizes the primary side current and thereby generates the second control signal that controls the state of the primary side power transistor, thus providing PSR. The secondary side follow-up control module receives the first control signal and thereby generates the third control signal that controls the state of the primary side power transistor, thus providing SSR. The control switching module receives the third sample signal that characterizes the output voltage and causes a switching from PSR to SSR when the third sample signal satisfies the predefined condition. During startup of the inventive isolated power converter, the primary side control module provides PSR first, and when the predefined condition is satisfied, the control switching module causes a switching from PSR to SSR so that the secondary side follow-up control module provides SSR. In this way, output voltage overshoot can be prevented during the startup process. Further, the predefined condition can be configured and modified to adapt to various input and output conditions, by changing circuit parameters of the control circuit or the power converter.

LIST OF REFERENCE NUMERALS

100 isolated power converter; Q primary side power transistor; T isolation transformer; Np primary winding; Ns secondary winding; Na auxiliary winding; SR secondary side synchronous rectifier; Cout output filter capacitor; AC AC power source; Vout output voltage; 10 secondary side controller; 101 secondary side control signal generator module; 1011 second comparator; 1012 second logic circuit; 1013 timer; 20 primary side controller; 21 primary side control module; 2111 first comparator; 2112 first logic circuit; 211 first drive generator module; 212 frequency control module; 213 turn-off control module; 214 operational amplifier; 22 secondary side follow-up control module; 222 frequency and on-time control module; 221 second drive generator module; 23 control switching module; 24 resistive voltage divider module; 25 threshold setting module; 30 coupler; VFB first sample signal; Vcs second sample signal; Vout_sample third sample signal; Vcontrol1 first control signal; Vcontrol2 second control signal; Vcontrol3 third control signal; Cons_fs, PSR_fs primary side frequency control signal; Cons_Vlimit, PSR_Vlimit-primary side on-time control signal; SSR_Vlimit secondary side on-time control signal; Comp_PSR primary side amplified error signal; Vref1 first reference voltage signal; Vref2 second reference voltage signal; Vref3 third reference voltage signal; Transition switching threshold; R1, R2 voltage divider resistor; R3, R4 tuning resistor; PGND primary side ground; SGND secondary side ground; IR current source; VR voltage source; Vcot_S secondary side on-time control signal.

DETAILED DESCRIPTION

Specific embodiments of the present disclosure will be described in greater detail below with reference to the accompanying schematic drawings. From the following description, advantages and features of the invention will become more apparent. Note that the figures are provided in a very simplified form not necessarily drawn to exact scale for the only purpose of helping to explain the disclosed embodiments in a more convenient and clearer way.

Example 1

Figure 1:
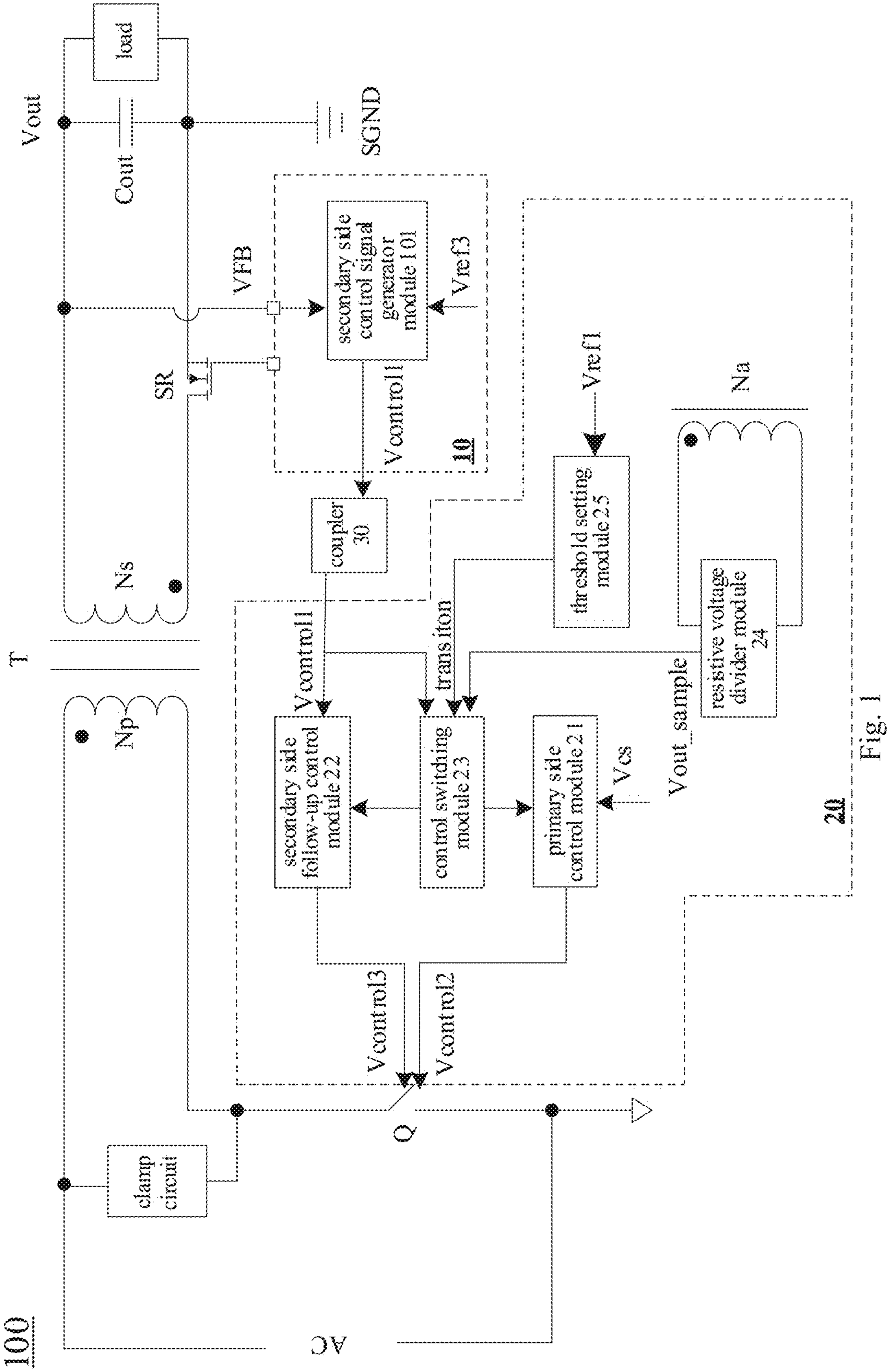
FIG. 1 shows a circuit diagram of an isolated power converter according to a first embodiment of the present disclosure.

In one embodiment, there is provided an isolated power converter and its control circuit. FIG. 1 shows a circuit diagram of an isolated power converter 100 according to an embodiment of the present disclosure. As shown in FIG. 1, the isolated power converter 100 includes an isolation transformer T, a control circuit, a primary side power transistor Q, clamp circuit, a secondary side synchronous rectifier SR, an output filter capacitor Cout and other necessary components. The isolation transformer T includes a primary winding Np, a secondary winding Ns and an auxiliary winding Na.

Specifically, the primary winding Np and the auxiliary winding Na in the isolation transformer T, the primary side power transistor Q and the clamp circuit are all arranged on the primary side of the isolated power converter 100. An input terminal of the primary side is coupled to an external AC power source AC. The secondary winding Ns in the isolation transformer T, the secondary side synchronous rectifier SR and the output filter capacitor Cout are arranged on the secondary side of the isolated power converter 100. An output terminal of the secondary side is coupled to a load and adapted to provide an output voltage Vout for supplying power to the load.

The control circuit includes a primary side controller 20, a secondary side controller 10 and a coupler 30. The primary side controller 20 is arranged on the primary side, and the secondary side controller 10 is provided on the secondary side. The primary side controller 20 and the secondary side controller 10 are configured to control energy transfer from an input terminal of the isolated power converter 100 to its output terminal. The coupler 30 is coupled to the primary side controller 20 and the secondary side controller 10. The coupler 30 is configured to receive a signal from the secondary side controller 10, modulate the received signal and send the modulated signal from the secondary side to the primary side.

It will be understood that the coupler 30 may employ any common technique for isolated communication between the primary side and secondary side, such as optical, magnetic or capacitive coupling. Alternatively, on-off keying (OOK) may be utilized to modulate the signal from the secondary side controller 10 into a pulse for transmission.

The topological essence of such an isolated power converter is well known to those skilled in the art and therefore does not need to be described in further detail herein.

With continued reference to FIG. 1, the secondary side controller 10 includes a secondary side control signal generator module 101, the secondary side control signal generator module 101 is configured to receive a first sample signal VFB characterizing an output voltage Vout of the isolated power supply and generate a first control signal Vcontrol1, the first control signal Vcontrol1 is capable of controlling a state of the primary side power transistor Q. The first control signal Vcontrol1 is coupled to the primary side controller 20 by the coupler 30. Circuit implementations of the secondary side control signal generator module 101 are described in detail below.

In this embodiment, the isolated power converter 100 includes a signal sensor (not shown in FIG. 1) for sensing the output voltage Vout of the isolated power converter 100 and generating the first sample signal VFB. In this embodiment, the signal sensor may be a separate component from the secondary side controller 10. In alternative embodiments, the signal sensor may be integrated with the secondary side controller 10 in a single die or chip. As well known to those skilled in the art, common examples of the signal sensor may include resistive voltage dividers, and further description thereof is omitted herein.

It is a matter of course that the secondary side controller 10 is capable of controlling a state of the secondary side synchronous rectifier SR. For example, the secondary side controller 10 may generate, based on a voltage signal across the secondary winding Ns and the first sample signal VFB, a secondary side control signal which controls the state of the secondary side synchronous rectifier SR. As how the secondary side controller 10 controls the state of the secondary side synchronous rectifier SR is not essential to the present disclosure, further description thereof is omitted herein.

The primary side controller 20 includes a primary side control module 21, a secondary side follow-up control module 22, a control switching module 23, a resistive voltage divider module 24 and a threshold setting module 25. The primary side control module 21 is configured to execute primary-side regulation (PSR) mode. Specifically, the primary side control module 21 is configured to receive a second sample signal Vcs characterizing a primary side current and thereby generate a second control signal Vcontrol2 which controls the state of the primary side power transistor Q.

Figure 2:
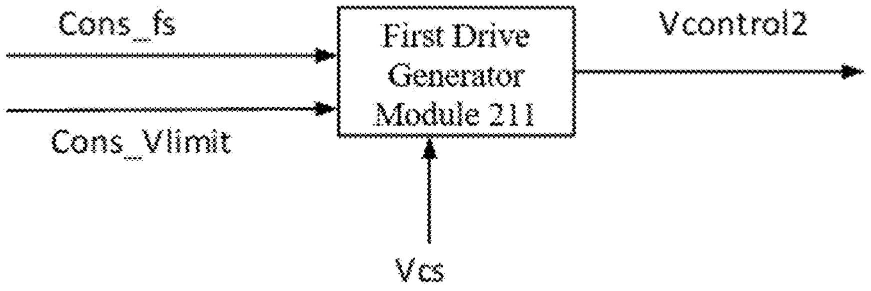
FIG. 2 shows a detailed circuit diagram of a primary side control module according to the first embodiment of the present disclosure.

FIG. 2 shows a detailed circuit diagram of the primary side control module 21 in this embodiment. As shown in FIG. 2, the primary side control module 21 includes a first drive generator module 211, which is configured to receive the second sample signal Vcs, a primary side frequency control signal Cons_fs and a primary side on-time control signal Cons_Vlimit and generate the second control signal Vcontrol2 to the primary side power transistor Q to control the state of the primary side power transistor Q. The primary side frequency control signal Cons_fs is used to control a turn-on time of the primary side power transistor Q, and the primary side on-time control signal Cons_Vlimit is used to control an on-time of the primary side power transistor Q. That is, it is used to control a turn-off time of the primary side power transistor Q.

Figure 3:
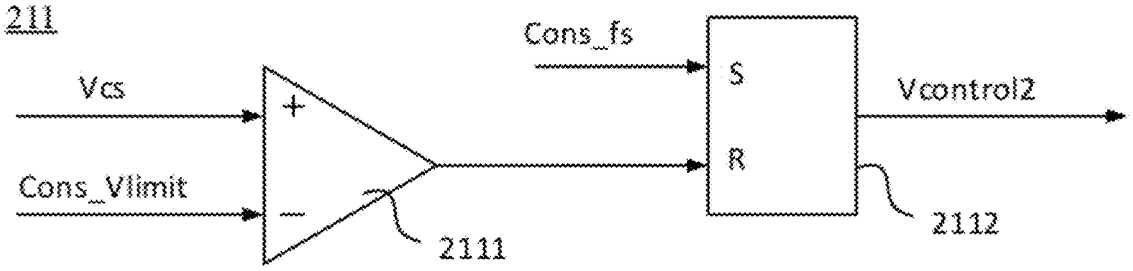
FIG. 3 shows a detailed circuit diagram of a first drive generator module according to the first embodiment of the present disclosure.

FIG. 3 shows a detailed circuit diagram of the first drive generator module 211 in this embodiment. As shown in FIG. 3, the first drive generator module 211 includes a first comparator 2111 and a first logic circuit 2112. The first comparator 2111 is configured to receive and compare the primary side on-time control signal Cons_Vlimit and the second sample signal Vcs and output a first comparison signal indicative of the comparison of the primary side on-time control signal Cons_Vlimit and the second sample signal Vcs. The first logic circuit 2112 is configured to receive the first comparison signal and the primary side frequency control signal Cons_fs and thereby generate the second control signal Vcontrol2.

In particular, the first logic circuit 2112 may be an RS flip-flop. In this case, the second sample signal Vcs may be received at a non-inverting input terminal of the first comparator 2111, and the primary side on-time control signal Cons_Vlimit may be received at an inverting input terminal thereof. The first comparison signal may be output from an output terminal of the first comparator 2111 to a reset terminal R of the RS flip-flop. The primary side frequency control signal Cons_fs may be received at a set terminal S of the RS flip-flop, and the second control signal Vcontrol2 may be output from an output terminal of the RS flip-flop. The second control signal Vcontrol2 carries information about the turn-on and turn-off times of the primary side power transistor Q and can thereby control the state of the primary side power transistor Q to execute PSR mode.

For example, when the second sample signal Vcs is higher than the primary side on-time control signal Cons_Vlimit, a high level may be output from the output terminal of the first comparator 2111 to the reset terminal R of the RS flip-flop, and a low level may be output from the output terminal of the RS flip-flop, thereby turning off the primary side power transistor Q.

In this embodiment, both the primary side on-time control signal Cons_Vlimit and the primary side frequency control signal Cons_fs are predefined fixed signals which do not vary.

It will be understood that the second sample signal Vcs may be obtained using any suitable known method. For example, a sampling resistor may be provided on the primary side, and a voltage across the sampling resistor may be sampled as the second sample signal Vcs.

The secondary side follow-up control module 22 is configured to execute secondary side regulation (SSR) mode. Specifically, the secondary side follow-up control module 22 can receive the first control signal Vcontrol1 from the coupler 30 and generate a third control signal Vcontrol3 for controlling the state of the primary side power transistor Q.

Figure 4:
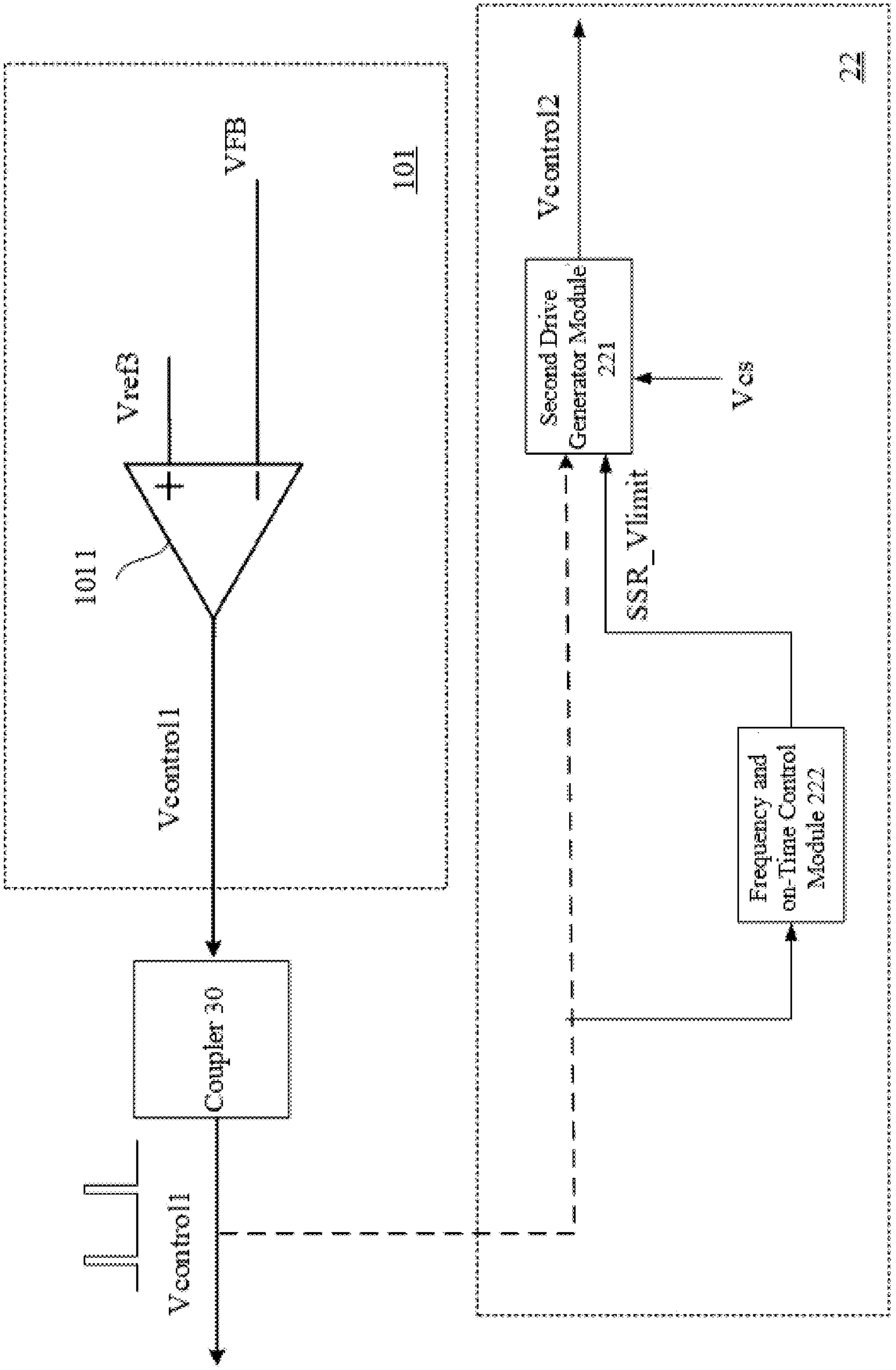
FIG. 4 shows a circuit diagram of a secondary side control signal generator module and a secondary side follow-up control module according to the first embodiment of the present disclosure.

FIG. 4 shows circuit diagrams of the secondary side control signal generator module 101 and the secondary side follow-up control module 22 in this embodiment. As shown in FIG. 4, this embodiment may employ a control strategy based on output voltage ripple, for example. In this case, the secondary side control signal generator module 101 includes a second comparator 1011, which is configured to receive and compare the first sample signal VFB and a third reference voltage signal Vref3 and generate a second comparison signal indicative of the comparison of the first sample signal VFB and the third reference voltage signal Vref3. Moreover, the second comparison signal serves as the aforementioned first control signal Vcontrol1. Accordingly, the first control signal Vcontrol1 carries information only about the turn-on time of the primary side power transistor Q. The coupler 30 receives the first control signal Vcontrol1 and sends it from the secondary side to the secondary side follow-up control module 22 on the primary side.

In addition, the secondary side follow-up control module 22 includes a frequency and on-time control module 222 and a second drive generator module 221. The frequency and on-time control module 222 receives the first control signal Vcontrol1 from the coupler 30 and generates a secondary side on-time control signal SSR_Vlimit for controlling the on-time of the primary side power transistor Q. That is, the secondary side on-time control signal SSR_Vlimit is used to control the turn-off time of the primary side power transistor Q. The second drive generator module 221 receives the first control signal Vcontrol1 from the coupler 30, the secondary side on-time control signal SSR_Vlimit and the second sample signal Vcs and generates the third control signal Vcontrol3 to the primary side power transistor Q to control the state of the primary side power transistor Q.

In this embodiment, although the first control signal Vcontrol1 carries information only about the turn-on time of the primary side power transistor Q, with the secondary side on-time control signal SSR_Vlimit from the frequency and on-time control module 222 in the secondary side follow-up control module 22, the third control signal Vcontrol3 that is eventually output to the primary side power transistor Q is able to control the state of the primary side power transistor Q.

The second drive generator module 221 may be implemented as a similar circuit to that of the first drive generator module 211 of FIG. 3, and further description thereof is omitted herein.

With continued reference to FIG. 1, the threshold setting module 25 is configured to receive a first reference voltage signal Vref1 and thereby generate a switching threshold Transition.

Notably, in this embodiment, in order to maximize the success rate of the isolated power converter in startup, the switching threshold Transition is desired to be lower than the third reference voltage signal Vref3.

Figure 5A:
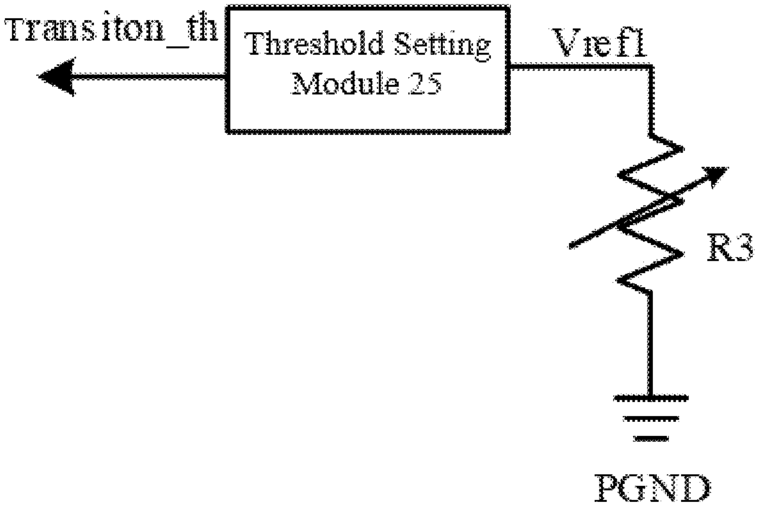
FIG. 5*a* schematically illustrates a circuit for providing a first reference voltage signal according to the first embodiment of the present disclosure.

FIG. 5*a* schematically shows a circuit for providing the first reference voltage signal Vref1 according to this embodiment. As shown in FIG. 5*a*, the primary side controller 20 further includes a tuning resistor R3, the tuning resistor R3 has a first end connected to the threshold setting module 25 and a second end connected to a primary side ground PGND. The tuning resistor R3 is configured to provide the first reference voltage signal Vref1 at the first end. That is, a voltage signal at the first end of the tuning resistor R3 is taken as the first reference voltage signal Vref1.

In this case, the tuning resistor R3 may be an adjustable resistor. The resistance of the tuning resistor R3 can be adjusted to tune the first reference voltage signal Vref1 and hence the switching threshold Transition.

Figure 5B:
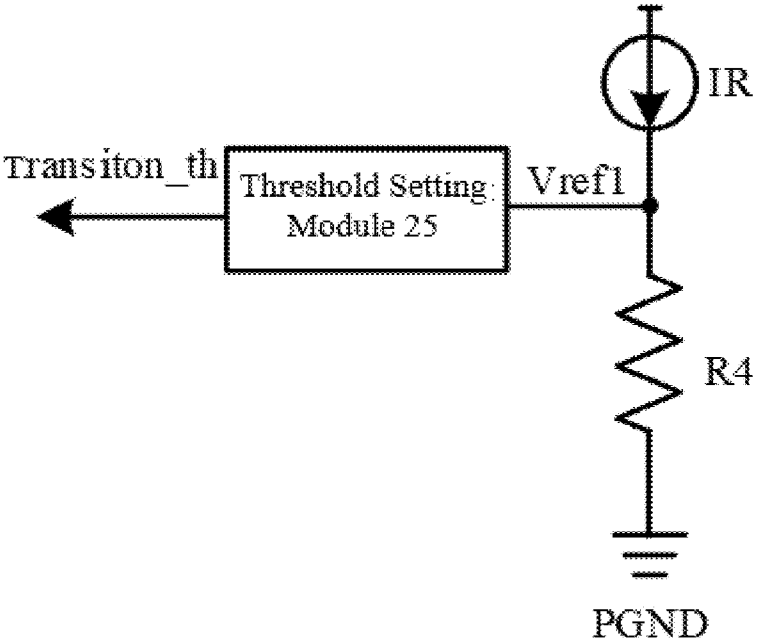
FIG. 5*b* schematically illustrates another circuit for providing the first reference voltage signal according to the first embodiment of the present disclosure.

FIG. 5*b* schematically shows another circuit for providing the first reference voltage signal Vref1 according to this embodiment. As shown in FIG. 5*b*, the primary side controller 20 further includes a tuning resistor R4 and a current source IR. A first end of the tuning resistor R4 is connected to the current source IR and the threshold setting module 25, and a second end of the tuning resistor R4 is connected to the primary side ground PGND. The first reference voltage signal Vref1 is provided at a node between the first end of the tuning resistor R4 and the current source IR. That is, a voltage signal at the node between the first end of the tuning resistor R4 and the current source IR is taken as the first reference voltage signal Vref1.

In this case, the first reference voltage signal Vref1 and hence the switching threshold Transition can be adjusted through the current source IR.

In some implementations, the tuning resistor R4 may also be an adjustable resistor. In these cases, apart from using the current source IR, the switching threshold Transition may be tuned by changing the resistance of the tuning resistor R4.

Figure 5C:
FIG. 5*c* schematically illustrates yet another circuit for providing the first reference voltage signal according to the first embodiment of the present disclosure.

FIG. 5*c* schematically shows yet another circuit for providing the first reference voltage signal Vref1 according to this embodiment. As shown in FIG. 5*c*, the primary side controller 20 further includes a voltage source VR, which is connected to the threshold setting module 25 and thus able to directly provide the first reference voltage signal Vref1 to the threshold setting module 25. That is, a signal output from the voltage source VR is taken as the first reference voltage signal Vref1.

In this case, the first reference voltage signal Vref1 and hence the switching threshold Transition can be adjusted through the voltage source VR.

Figure 6:
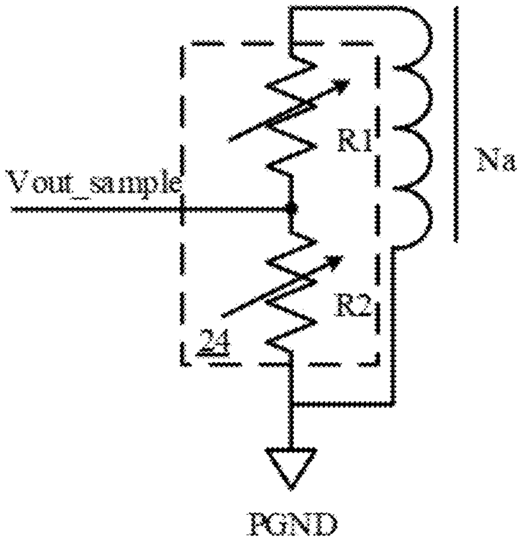
FIG. 6 is a circuit diagram of a resistive voltage divider module according to the first embodiment of the present disclosure.

FIG. 6 shows a circuit diagram of the resistive voltage divider module 24 in this embodiment. As shown in FIG. 6, the resistive voltage divider module 24 includes series-connected voltage divider resistors R1 and R2. Specifically, a first end of the voltage divider resistor R1 is connected to a first end of the auxiliary winding Na, and a second end of the voltage divider resistor R1 is connected to a first end of the voltage divider resistor R2. A second end of the voltage divider resistor R2 is connected to both a second end of the auxiliary winding Na and the primary side ground PGND. With this arrangement, a third sample signal Vout_sample characterizing the output voltage Vout is provided at a node between the second end of the voltage divider resistor R1 and the first end of the voltage divider resistor R2.

In this embodiment, the voltage divider resistor R1 and/or the voltage divider resistor R2 may be adjustable resistor(s), and a sampling ratio of the resistive voltage divider module 24 and hence the magnitude of the third sample signal Vout_sample may be tuned by adjusting the resistance(s) of the voltage divider resistor R1 and/or the voltage divider resistor R2.

In some embodiments, the resistance of each of the voltage divider resistors R1 and R2 may be fixed, and a voltage adjustment module may be connected to an output terminal of the resistive voltage divider module 24. In these cases, the third sample signal Vout_sample may be adjusted through the voltage adjustment module. The voltage adjustment module may adopt, for example, any of the structures of FIGS. 5*a* to 5*c*.

With continued reference to FIG. 1, the control switching module 23 is configured to receive the third sample signal Vout_sample and, if the third sample signal Vout_sample satisfies a predefined condition, switch the primary side controller 10 from a PSR mode to an SSR mode.

Specifically, in this embodiment, when the third sample signal Vout_sample is higher than the switching threshold Transition, it may be determined to satisfy the predefined condition. In this embodiment, as the magnitude of the third sample signal Vout_sample and/or the magnitude of the switching threshold Transition is/are adjustable, the predefined condition (for PSR-to-SSR switching) is also adjustable. As detailed below, such an adjustable predefined condition can offer a number of benefits.

Figure 7A:
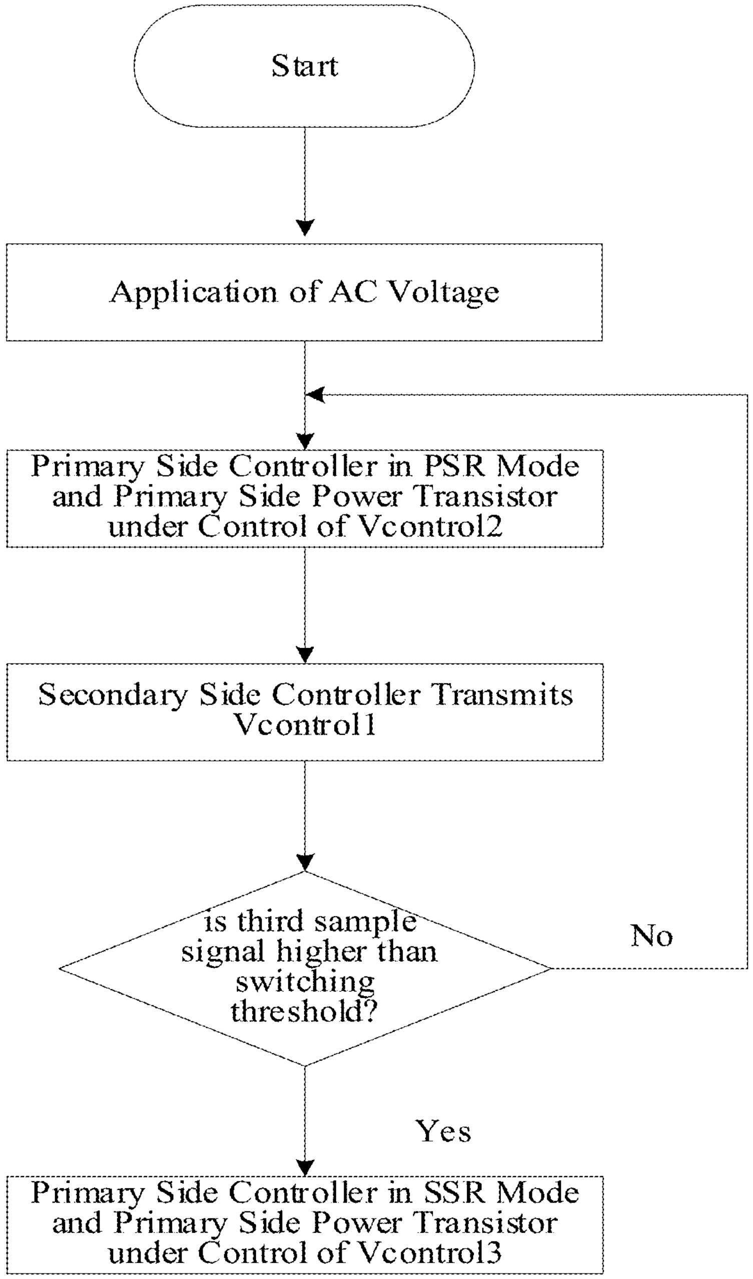
FIG. 7*a* schematically illustrates one implementation of a method for controlling the isolated power converter according to the first embodiment of the present disclosure.
Figure 7B:
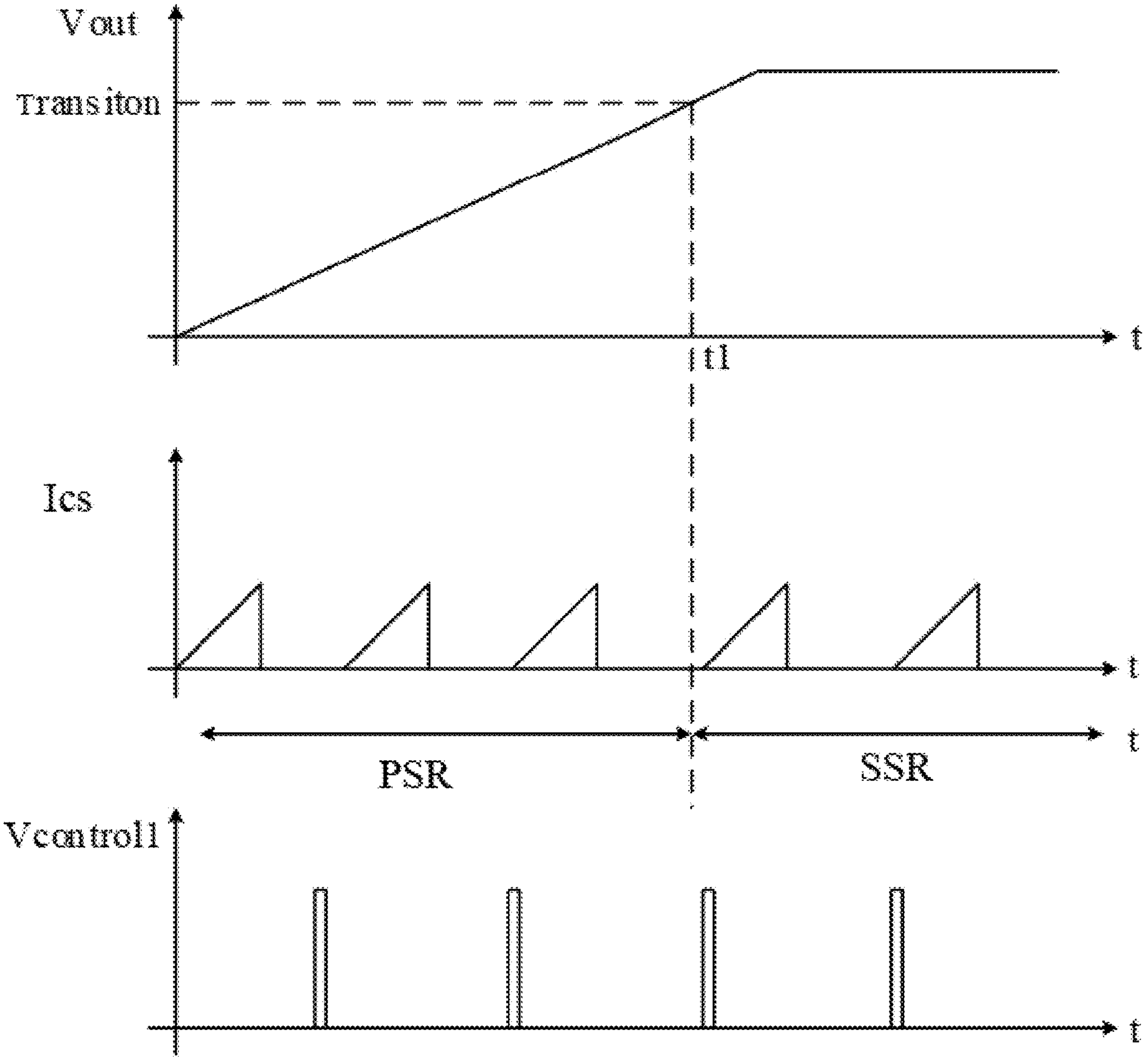
FIG. 7*b* is a timing diagram of some signals in the isolated power converter according to the first embodiment of the present disclosure.

FIG. 7*a* schematically illustrates one implementation of a method for controlling the isolated power converter of this embodiment. FIG. 7*b* is a timing diagram of some signals in the isolated power converter of this embodiment. With combined reference to FIGS. 1, 7*a* and 7*b*, first of all, the isolated power converter 100 is turned on, and AC power is supplied thereto by the AC power source AC. The primary side controller 20 gets power first and starts to operate. The primary side control module 21 acquires the second sample signal Vcs that characterizes the primary side current, and the second control signal Vcontrol2 is generated to control the state of the primary side power transistor Q, executing PSR. At a result, the output voltage Vout gradually rises.

The control switching module 23 receives the third sample signal Vout_sample that characterizes the output voltage Vout in real time and determines whether the third sample signal Vout_sample meets the predefined condition (i.e., whether the third sample signal Vout_sample is higher than the switching threshold Transition).

In response, the secondary side controller 10 gets power and starts operation. The secondary side controller 10 acquires the first sample signal VFB that characterizes the output voltage Vout and generates the first control signal Vcontrol1. The coupler 30 transmits the first control signal Vcontrol1 from the secondary side to the primary side.

At time t1, the control switching module 23 determines that the third sample signal Vout_sample satisfies the predefined condition (i.e., that the third sample signal Vout_sample is higher than the switching threshold Transition). Accordingly, the control switching module 23 switches the primary side controller 10 from a PSR mode to an SSR mode.

After that, the secondary side follow-up control module 22 receives the first control signal Vcontrol1 and generates the third control signal Vcontrol3 that controls the state of the primary side power transistor Q, thus executing SSR mode.

Thus, it can be seen that, in this implementation, during startup of the isolated power converter 100, the primary side controller 20 operates first in the PSR mode and then in the SSR mode. This can prevent overshoot of the output voltage Vout during the startup process.

Figure 8A:
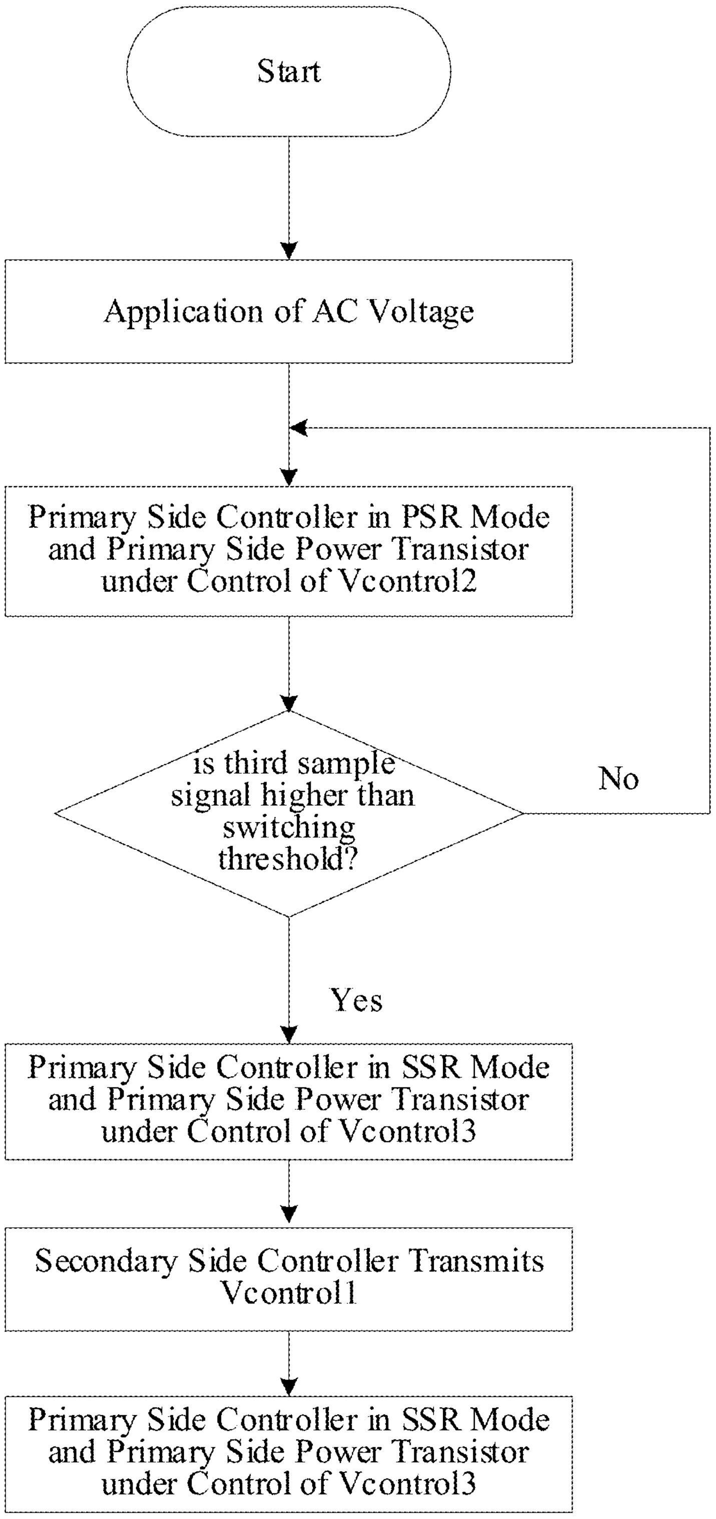
FIG. 8*a* schematically illustrates another implementation of the method for controlling the isolated power converter according to the first embodiment of the present disclosure.
Figure 8B:
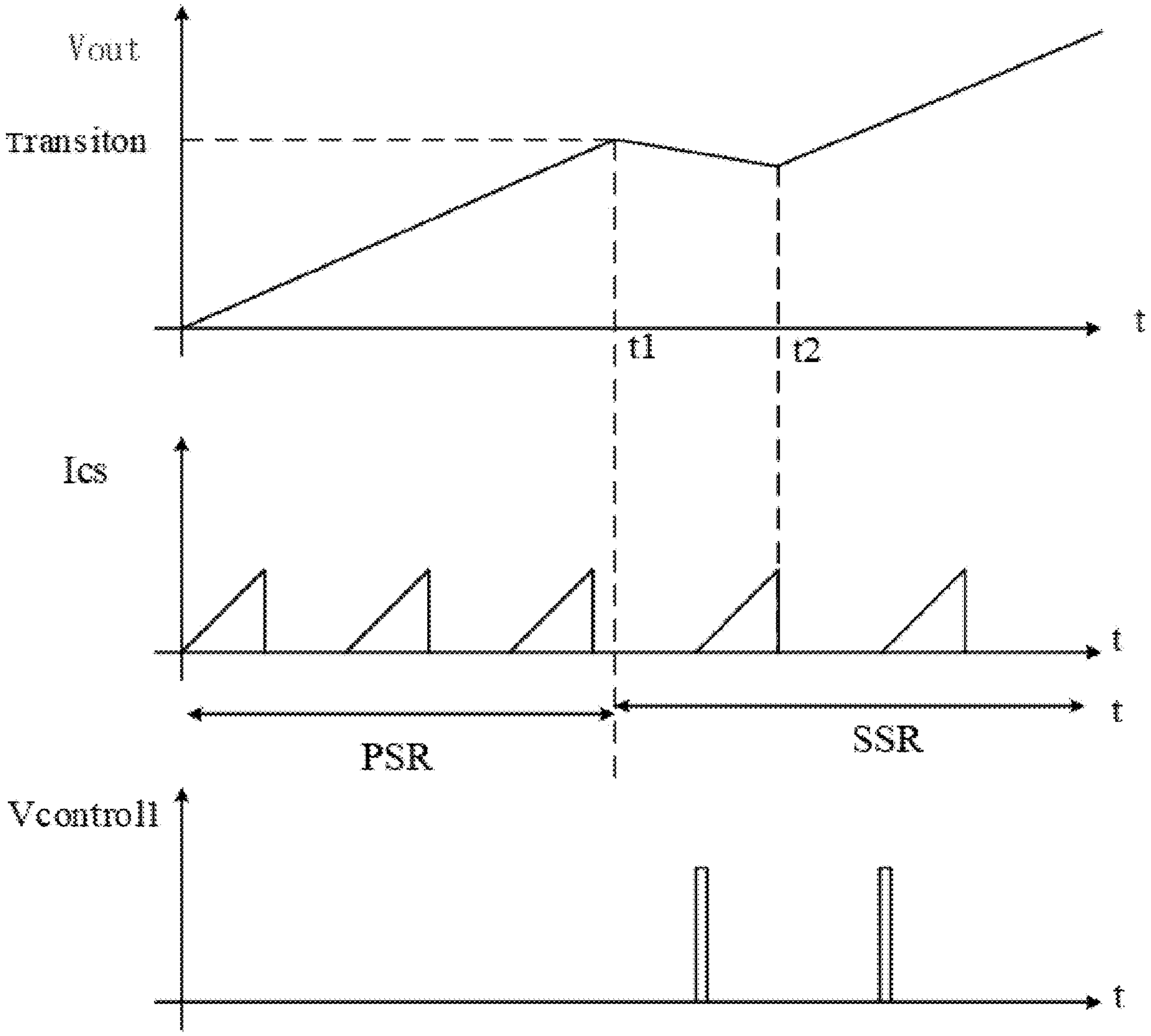
FIG. 8*b* is a timing diagram of some signals in an isolated power converter according to a second embodiment of the present disclosure.

FIG. 8*a* schematically illustrates another implementation of the method for controlling the isolated power converter of this embodiment. FIG. 8*b* is a timing diagram of some signals in the isolated power converter of this embodiment. With combined reference to FIGS. 1, 8*a* and 8*b*, first of all, the isolated power converter 100 is turned on, and AC power is supplied thereto by the AC power source AC. The primary side controller 20 gets power first and starts to operate. The primary side control module 21 acquires the second sample signal Vcs that characterizes the primary side current, and the second control signal Vcontrol2 is generated to control the state of the primary side power transistor Q, executing PSR mode. At a result, the output voltage Vout gradually rises.

The control switching module 23 receives the third sample signal Vout_sample that characterizes the output voltage Vout in real time and determines whether the third sample signal Vout_sample meets the predefined condition (i.e., whether it is higher than the switching threshold Transition).

At time t1, the control switching module 23 determines that the third sample signal Vout_sample satisfies the predefined condition (i.e., that it is higher than the switching threshold Transition). Accordingly, the control switching module 23 switches the primary side controller 10 from a PSR mode to an SSR mode. As a result, the primary side controller 10 begins waiting for the arrival of the first control signal Vcontrol1, and the output voltage Vout starts decreasing.

At a later time after t1, the secondary side controller 10 gets power and starts to operate. Accordingly, it acquires the first sample signal VFB that characterizes the output voltage Vout and generates the first control signal Vcontrol1, and the coupler 30 transmits the first control signal Vcontrol1 from the secondary side to the primary side.

After that, the secondary side follow-up control module 22 receives the first control signal Vcontrol1 and generates at t2 the third control signal Vcontrol3 that controls the state of the primary side power transistor, thus executing SSR mode.

In this implementation, during the startup process of the isolated power converter 100, the primary side controller 20 operates first in the PSR mode and then in the SSR mode. Therefore, overshoot of the output voltage Vout during startup can be prevented. However, as revealed by a comparison made between FIGS. 7*b* and 8*b*, the output voltage Vout will experience a drop in the period after the primary side controller 10 switches from the PSR mode to the SSR mode and before the secondary side controller 10 outputs the first control signal Vcontrol1.

Accordingly, in this implementation, the predefined condition is allowed to be modified to shift the time of switching from the PSR mode to the SSR mode in FIG. 8*b* to the left or right so that the output voltage Vout rises smoothly without experiencing a decrease in the startup process of the isolated power converter 100. In this way, the reliability and safety of the system can be improved, and the isolated power converter 100 can be used in various applications with different input and output conditions.

Specifically, in the event of startup failure of the isolated power converter 100 due to the switching threshold Transition that is lower than the third reference voltage signal Vref3, or of a drop of the output voltage Vout despite successful startup of the isolated power converter 100, the switching threshold Transition may be increased, or the third sample signal Vout_sample may be reduced. Further, in the event of unsmooth rising of the output voltage Vout in spite of successful startup of the isolated power converter 100, the switching threshold Transition may be decreased, or the third sample signal Vout_sample may be increased.

Example 2

Figure 9:
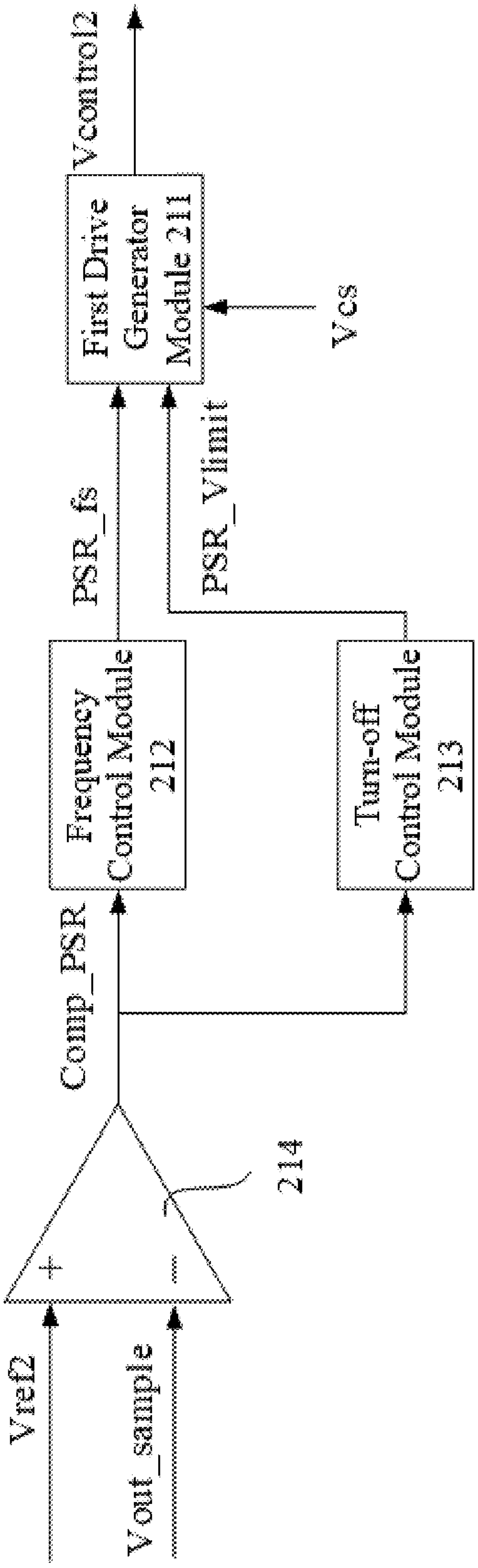
FIG. 9 is a detailed circuit diagram of a primary side control module according to the second embodiment of the present disclosure.

FIG. 9 shows a detailed circuit diagram of a primary side control module 21 according to a second embodiment. As shown in FIG. 9, this embodiment differs from the first embodiment in that the primary side control module 21 further includes an operational amplifier 214, a frequency control module 212 and a turn-off control module 213. The operational amplifier 214 is configured to receive the third sample signal Vout_sample that characterizes the output voltage Vout and a second reference voltage signal Vref2 and amplify an error between them to generate a primary side amplified error signal Comp_PSR. The frequency control module 212 receives the primary side amplified error signal Comp_PSR and generates a primary side frequency control signal PSR_fs for controlling a turn-on time of the primary side power transistor Q. The turn-off control module 213 receives the primary side amplified error signal Comp_PSR and generates a primary side on-time control signal PSR_Vlimit for controlling an on-time of the primary side power transistor Q, i.e., controlling a turn-off time thereof.

Specifically, the third sample signal Vout_sample is received at an inverting input terminal of the operational amplifier 214, and the second reference voltage signal Vref2 is received at a non-inverting input terminal thereof. The primary side amplified error signal Comp_PSR is output from an output terminal of the operational amplifier 214 to an input terminal of the frequency control module 212 and to an input terminal of the turn-off control module 213. The primary side frequency control signal PSR_fs is output from an output terminal of the frequency control module 212 to an input terminal of the first drive generator module 211 to control a frequency of the primary side power transistor Q, i.e., to control the turn-on time of the primary side power transistor Q. The primary side on-time control signal PSR_Vlimit is output from an output terminal of the turn-off control module 213 to another input terminal of the first drive generator module 211 to control the on-time of the primary side power transistor Q, i.e., to control the turn-off time of the primary side power transistor Q. The second control signal Vcontrol2 is output from an output terminal of the first drive generator module 211 to control the state of the primary side power transistor Q to execute PSR.

In this embodiment, the primary side on-time control signal PSR_Vlimit and the primary side frequency control signal PSR_fs are adaptive signals varying with the value of the output voltage Vout.

Figure 10:
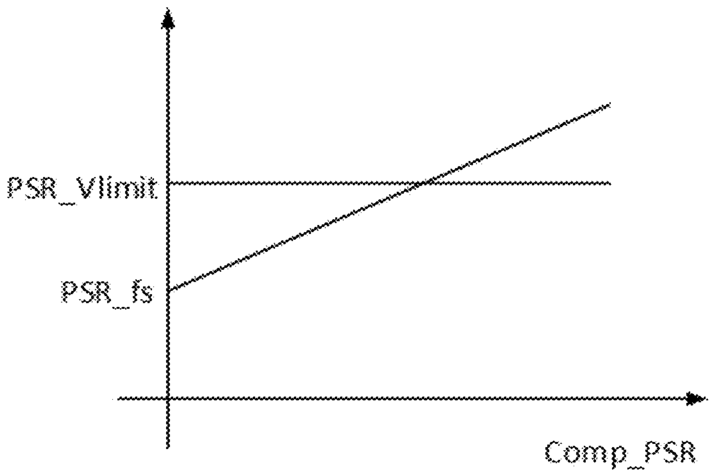
FIG. 10 shows a relationship of a primary side amplified error signal and a primary side frequency control signal and a relationship of the primary side amplified error signal and a primary side on-time control signal according to a second embodiment of the present disclosure.

FIG. 10 shows a relationship of the primary side amplified error signal Comp_PSR and the primary side frequency control signal PSR_fs and a relationship of the primary side amplified error signal Comp_PSR and the primary side on-time control signal PSR_Vlimit according to this embodiment. As shown in FIG. 10, the primary side amplified error signal Comp_PSR is positively correlated with the primary side frequency control signal PSR_fs, and increases as the latter increases. The primary side on-time control signal PSR_Vlimit is constant and does not vary with the primary side amplified error signal Comp_PSR. Of course, in other non-limiting embodiments, the primary side amplified error signal Comp_PSR and the primary side frequency control signal PSR_fs may have a different relationship, and the primary side amplified error signal Comp_PSR and the primary side on-time control signal PSR_Vlimit may also have a different relationship.

Notably, in this embodiment, in order to maximize the success rate of the isolated power converter in startup, the switching threshold Transition is desired to be lower than both the second reference voltage signal Vref2 and the third reference voltage signal Vref3.

Example 3

Figure 11:
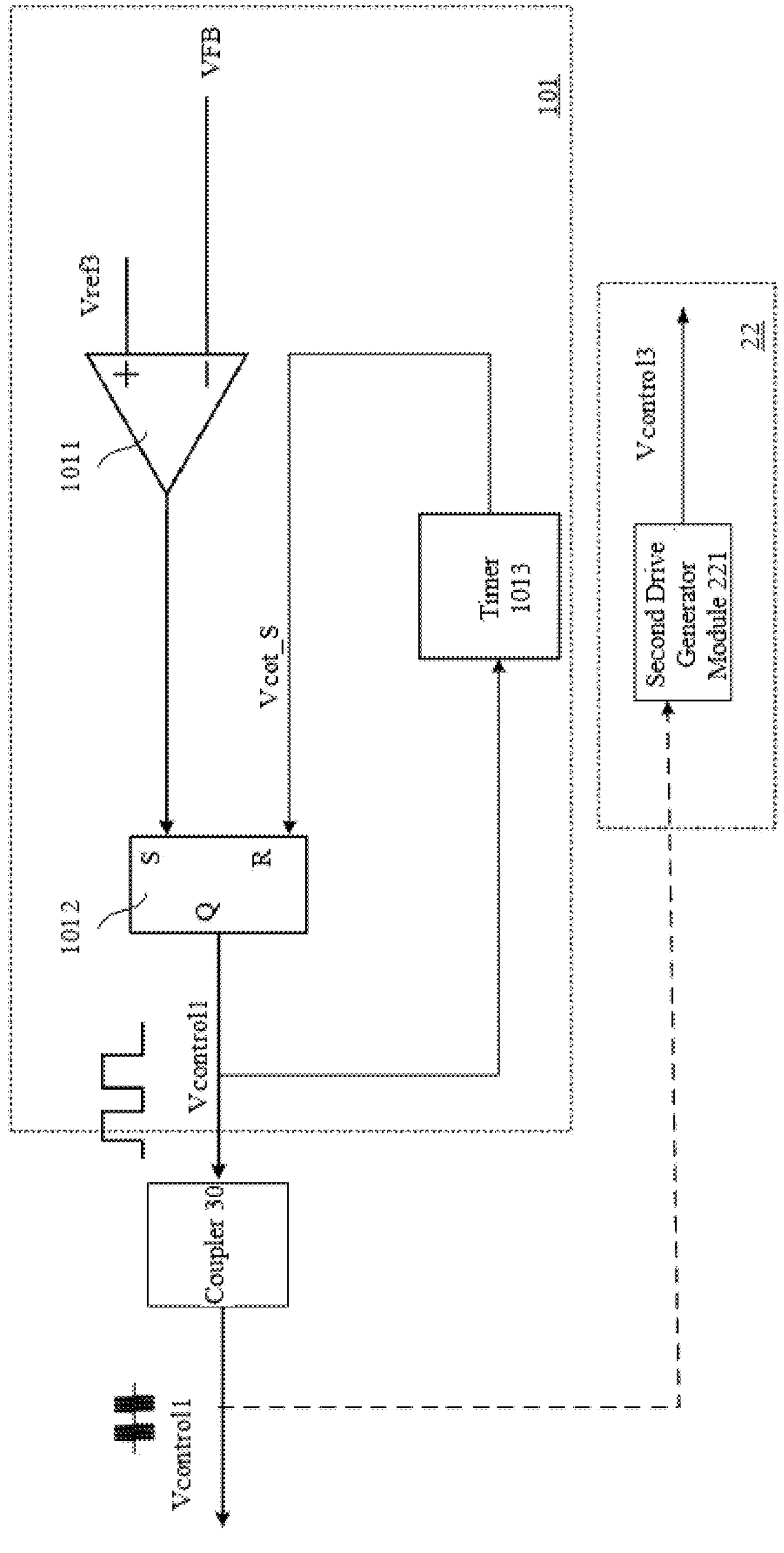
FIG. 11 shows a circuit diagram of a secondary side control signal generator module and a secondary side follow-up control module according to a third embodiment of the present disclosure.

FIG. 11 shows a circuit diagram of a secondary side control signal generator module 101 and a secondary side follow-up control module 22 according to a third embodiment of the present disclosure. As shown in FIG. 11, this embodiment differs from the first embodiment in that the first control signal Vcontrol1 carries information about both turn-on and turn-off times of the primary side power transistor Q.

For example, this embodiment may employ a control strategy based on output voltage ripple. In this case, the secondary side control signal generator module 101 includes a second comparator 1011, a second logic circuit 1012 and a timer 1013. The second comparator 1011 is configured to receive and compare the first sample signal VFB and the third reference voltage signal Vref3 and thereby generate a second comparison signal.

Specifically, the third reference voltage signal Vref3 is input to a non-inverting output terminal of the second comparator 1011, and the first sample signal VFB is input to an inverting input terminal thereof. The second comparison signal is output from an output terminal of the second comparator 1011. The timer 1013 is started at the turn-on time of the primary side power transistor Q and outputs, after a preset length of time, a secondary side on-time control signal Vcot_S for controlling the on-time of the primary side power transistor Q. The second logic circuit 1012 is configured to receive the second comparison signal and the secondary side on-time control signal Vcot_S and thereby generate the first control signal Vcontrol1 that carries information about both the turn-on and turn-off times of the primary side power transistor Q. The coupler 30 receives the first control signal Vcontrol1 and passes it on to the secondary side follow-up control module 22.

In this embodiment, the second logic circuit 1012 is an RS flip-flop. The second comparison signal is received at a reset terminal R of the RS flip-flop, and the first control signal Vcontrol1 is output from an output terminal thereof. The timer 1013 receives the first control signal Vcontrol1 and outputs the secondary side on-time control signal Vcot_S to a reset terminal R of the flip-flop.

The secondary side follow-up control module 22 includes a second drive generator module 221 which receives the first control signal Vcontrol1 and generates the third control signal Vcontrol3.

In this embodiment, since the first control signal Vcontrol1 carries information about both the turn-on and turn-off times of the primary side power transistor Q, only the second drive generator module 221 needs to be set within the secondary side follow-up control module 22. The third control signal Vcontrol3 eventually output to the primary side power transistor Q can control the state of the primary side power transistor Q.

In summary, in the isolated power converters and control circuits thereof according to the embodiments of the present disclosure, the secondary side controller receives the first sample signal that characterizes the output voltage of the isolated power converter and thereby generates the first control signal. The primary side control module receives the second sample signal that characterizes the primary side current and thereby generates the second control signal that controls the state of the primary side power transistor, thus executing PSR mode. The secondary side follow-up control module receives the first control signal and thereby generates the third control signal that controls the state of the primary side power transistor, thus executing SSR mode. The control switching module receives the third sample signal that characterizes the output voltage and causes a switching from a PSR mode to an SSR mode when the third sample signal satisfies the predefined condition. During startup of the inventive isolated power converter, the primary side control module provides PSR first, and when the predefined condition is satisfied, the control switching module causes a switching from a PSR mode to an SSR mode so that the secondary side follow-up control module executes SSR mode. In this way, output voltage overshoot can be prevented during the startup process. Further, the predefined condition can be configured and modified to adapt to various input and output conditions, by changing circuit parameters of the control circuit or the power converter.

It is to be noted that the embodiments disclosed herein are described in a progressive manner, with the description of each embodiment focusing on its differences from others. Reference can be made between the embodiments for their common or similar features. Since the system embodiments correspond to the method embodiments, they are described relatively briefly, and reference can be made to the method embodiments for more details of the system embodiments.

It is to be also noted that while the invention has been described above with reference to preferred embodiments thereof, it is not intended to be limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent changes and modifications made to the foregoing embodiments based on the substantive disclosure of the invention without departing from the scope thereof fall within this scope.

Further, it will be understood that, as used herein, the terms "first", "second", "third" and the like are only meant to distinguish various components, elements, steps, etc. from each other and are not intended to indicate logical or sequential orderings thereof, unless otherwise indicated or specified.

Furthermore, it is to be recognized that the terminology used herein is for the purpose of describing particular embodiments only, and is not intended to limit the scope of the present disclosure. It must be noted that, as used herein and in the appended claims, the singular forms "a" and "an" include the plural reference unless the context clearly dictates otherwise. Thus, for example, a reference to "a step" or "a means" is a reference to one or more steps or means and may include sub-steps and sub-means. All conjunctions used are to be understood in the most inclusive sense possible. Thus, the term "or" should be understood as having the definition of a logical "or" rather than that of a logical "exclusive or" unless the context clearly necessitates otherwise. Further, implementation of the method and/or device according to the embodiments of the present disclosure may involve performing selected tasks manually, automatically, or a combination thereof.

The invention claimed is:

1. A control circuit of an isolated power converter, the isolated power converter comprising a primary side power transistor, wherein the control circuit comprises a secondary side controller and a primary side controller, the secondary side controller configured to receive a first sample signal characterizing an output voltage of the isolated power converter and thereby generate a first control signal, the primary side controller comprising:

a primary side control module configured to receive a second sample signal characterizing a primary side current and thereby generate a second control signal, the second control signal controls a state of the primary side power transistor, thereby executing primary side regulation mode;

a secondary side follow-up control module configured to receive the first control signal and thereby generate a third control signal, the third control signal controls a state of the primary side power transistor, thereby providing secondary side regulation mode; and a control switching module configured to receive a third sample signal characterizing the output voltage and, when the third sample signal satisfies a predefined condition, switch the primary side control module from the primary side regulation mode to the secondary side regulation mode, wherein the predefined condition is modifiable, wherein when a value of the third sample signal is greater than a switching threshold, the third sample signal satisfies the predefined condition.

2. The control circuit of claim 1, wherein the primary side controller further comprises:

a resistive voltage divider module configured to sample the output voltage and thereby generate the third sample signal; and a threshold setting module configured to receive a first reference voltage signal and thereby generate the switching threshold.

3. The control circuit of claim 2, wherein the predefined condition is modifiable by adjusting a resistance of a voltage divider resistor in the resistive voltage divider module and hence a sampling ratio of the resistive voltage divider module.

4. The control circuit of claim 2, wherein the predefined condition is modifiable by adjusting a value of the first reference voltage signal.

5. The control circuit of claim 4, wherein the primary side controller further comprises:

a current source; and a tuning resistor, the tuning resistor comprising a first end connected to the current source and the threshold setting module and providing the first reference voltage signal, the tuning resistor comprising a second end connected to a primary side ground, wherein the predefined condition is modifiable by adjusting the value of the first reference voltage signal using the current source, and/or by adjusting the value of the first reference voltage signal through changing a resistance of the tuning resistor.

6. The control circuit of claim 1, wherein the primary side control module comprises a first drive generator module, the first drive generator module comprising:

a first comparator configured to receive and compare the second sample signal and a primary side on-time control signal and thereby generate a first comparison signal, the primary side on-time control signal configured to control an on-time of the primary side power transistor, and a first logic circuit configured to receive the first comparison signal and a primary side frequency control signal and thereby generate the second control signal, the primary side frequency control signal configured to control a turn-on time of the primary side power transistor.

7. The control circuit of claim 6, wherein both the primary side frequency control signal and the primary side on-time control signal are predefined fixed signals.

8. The control circuit of claim 6, wherein the primary side control module further comprises:

an operational amplifier configured to receive the third sample signal and a second reference voltage signal, amplify an error between the third sample signal and the second reference voltage signal, thereby generating a primary side amplified error signal;

a frequency control module configured to receive the primary side amplified error signal and thereby generate the primary side frequency control signal; and a turn-off control module configured to receive the primary side amplified error signal and thereby generate the primary side on-time control signal.

9. The control circuit of claim 8, wherein the switching threshold is smaller than a value of the second reference voltage signal.

10. The control circuit of claim 1, wherein the secondary side controller comprises a secondary side control signal generator module, the secondary side control signal generator module comprising:

a second comparator configured to receive and compare the first sample signal and a third reference voltage signal and thereby generate a second comparison signal serving as the first control signal, wherein the first control signal carries information about a turn-on time of the primary side power transistor, and wherein the secondary side follow-up control module comprises:

a frequency and on-time control module configured to receive the first control signal and thereby generate a secondary side on-time control signal; and a second drive generator module configured to receive the first control signal, the secondary side on-time control signal and the second sample signal and thereby generate the third control signal.

11. The control circuit of claim 1, wherein the secondary side controller comprises a secondary side control signal generator module, the secondary side control signal generator module comprising:

a second comparator configured to receive and compare the first sample signal and a third reference voltage signal and thereby generate a second comparison signal;

a timer configured to be started at a turn-on time of the primary side power transistor and generate a secondary side on-time control signal after a predetermined length of time; and a second logic circuit configured to receive the second comparison signal and the secondary side on-time control signal and thereby generate the first control signal, wherein the first control signal carries information about both the turn-on time and a turn-off time of the primary side power transistor, and wherein the secondary side follow-up control module comprises:

a second drive generator module configured to receive the first control signal and thereby generate the third control signal.

12. The control circuit of claim 10, wherein the switching threshold is smaller than a value of the third reference voltage signal.

13. The control circuit of claim 11, wherein the switching threshold is smaller than a value of the third reference voltage signal.

14. The control circuit of claim 2, wherein in the event of startup failure of the isolated power converter, or in the event of a drop of the output voltage despite successful startup of the isolated power converter, the switching threshold is increased, or the third sample signal is reduced, and wherein in the event of unsmooth rising of the output voltage despite successful startup of the isolated power converter, the switching threshold is decreased, or the third sample signal is increased.

15. An isolated power converter, comprising the control circuit of claim 1, wherein the control circuit is used to control a state of a primary side power transistor.

* * * * *